United States Patent [19]

Saito et al.

[11] Patent Number: 4,838,383
[45] Date of Patent: Jun. 13, 1989

[54] APPARATUS FOR CHECKING OUT PURCHASES

[75] Inventors: Kiyoshi Saito, Tokyo; Yoshiro Yamamoto, Chiba; Takeo Sakuragi, Tokyo, all of Japan

[73] Assignee: Tokyo Electrical Co., Ltd., Tokyo, Japan

[21] Appl. No.: 168,385

[22] Filed: Mar. 15, 1988

[30] Foreign Application Priority Data

Mar. 16, 1987 [JP] Japan .................................. 62-60803
May 29, 1987 [JP] Japan ................................. 62-135514

[51] Int. Cl.⁴ ............................................ G07C 11/00
[52] U.S. Cl. ...................................... 186/59; 186/61; 186/62; 235/383; 235/385
[58] Field of Search ............................. 186/59, 61, 62; 235/383, 384, 385; 340/825.35

[56] References Cited

U.S. PATENT DOCUMENTS 4,236,604 12/1980 Warner ................................. 186/61
4,676,343 6/1987 Humble et al. ....................... 186/61

FOREIGN PATENT DOCUMENTS 52-58658 5/1977 Japan .
52-59539 5/1977 Japan .
52-60754 5/1977 Japan .
52-60756 5/1977 Japan .
57-54 1/1982 Japan .

Primary Examiner—A. D. Pellinen
Assistant Examiner—Leon K. Fuller
Attorney, Agent, or Firm—Oblon, Fisher, Spivak, McClelland & Maier

[57] ABSTRACT

An apparatus for checking out purchases which includes a commodity counter with a commodity bearing surface which is flat and elongated leftward and rightward and a commodity reader portion provided on the aforesaid commodity counter in its center leaving a passage for a basket in front of the same, the commodity reader portion being provided with a reading window made in its front face and with a control portion and a display portion disposed above the same.

4 Claims, 4 Drawing Sheets

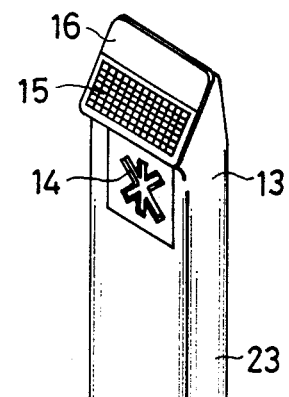
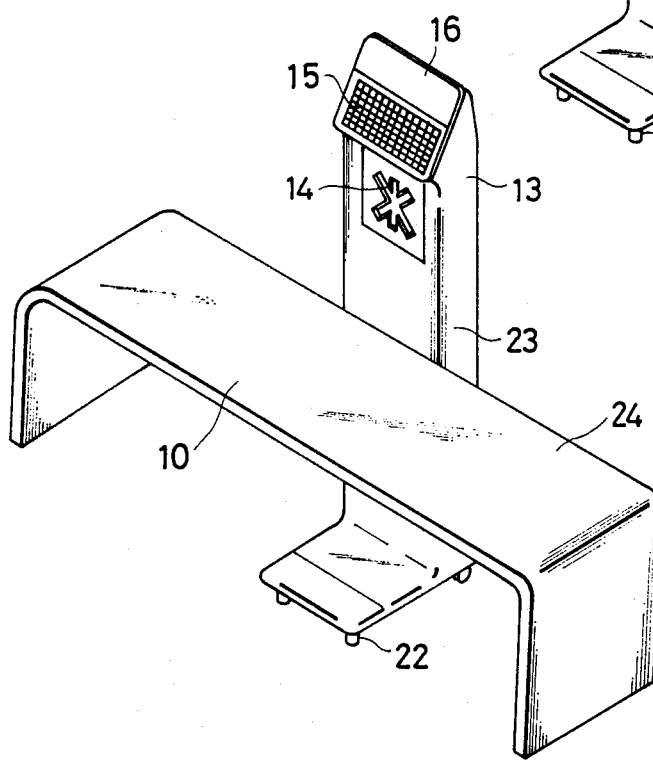

APPARATUS FOR CHECKING OUT PURCHASES

FIELD OF THE INVENTION AND RELATED ART STATEMENT

The present invention relates to an apparatus for checking out purchases which includes a bar code reader for reading data from a label with a bar code printed thereon and pasted on each of the purchased commodities, so that the commodity code, price and other data are registered and a display of the price is also given for the customer, automatically. A prior art example of such an apparatus will be described with reference to FIG. 7. On the right-hand side of the operator, there is installed a commodity counter 2 on which a basket 1 containing purchased commodities is mounted. To the left of the commodity counter 2, there is arranged a commodity reader portion 4 with a reading window 3 formed in its top face. The height of the reading window 3 of the commodity reader portion 4 is adapted to be virtually the same as the height of the aforesaid basket 1. At the top of the commodity reader portion 4, there are disposed a keyboard 5 and a display portion 6 with the former above the latter. To the left of the commodity reader portion 4, there is installed a second commodity counter 7 on which a basket for receiving commodities subjected to the bar code reading is mounted. On the left-hand side of the operator, there is movably installed a register 8.

When using such an apparatus, a basket 1 containing commodities purchased by a customer is mounted on the commodity counter 2, the operator picks up an individual commodity and passes it by hand over the reading window 3 of the commodity reader portion 4, whereby the bar code formed on the commodity is read out, and then, puts the commodity into an empty basket 1 mounted on the second commodity counter 7, and the aforesaid operations are repeated for all the commodities. Thus, the read out data are input to an incorporated memory, while individual data and the total sum are displayed on the display portion 6. Thereafter, payment and receipt of cash are carried out and thus a transaction with one customer is finished.

In the conventional apparatus as described above, since the layout is such that the baskets 1 are placed on both sides of the commodity reader portion 4 which has a considerable width, the commodity must necessarily be moved along such a large distance between the two baskets 1, and so, there has been a problem that the amount of movement of the commodity is large and much labor is required for handling.

Further, the emptied basket 1 on the right-hand side when operations for one customer are finished is required to be moved onto the second commodity counter 7 on the left-hand side, but the basket 1 at that time must be moved over the commodity reader portion 4 requiring considerable labor. This has been a second problem with the conventional apparatus.

A third problem is that the flow of customers along the check-out counter is retarded because the display portion 6 is placed where it is difficult for the customer to look at, causing each attended customer to stand still alongside the commodity counter 2 on the right-hand side, and therefore, the customers do not flow smoothly when the registration is over and then cash payment and receipt are made.

OBJECT AND SUMMARY OF THE INVENTION

A first object of the present invention is to make the amount of movement of the commodity smaller.

A second object of the present invention is to make the movement of the basket for receiving commodities simpler.

A third object of the present invention is to make the flow of customers smoother.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a perspective view showing a second embodiment of the present invention;

FIG. 6 is a perspective view of the same combined with a table; and

DESCRIPTION OF THE PREFERRED EMBODIMENTS

Figure 1:
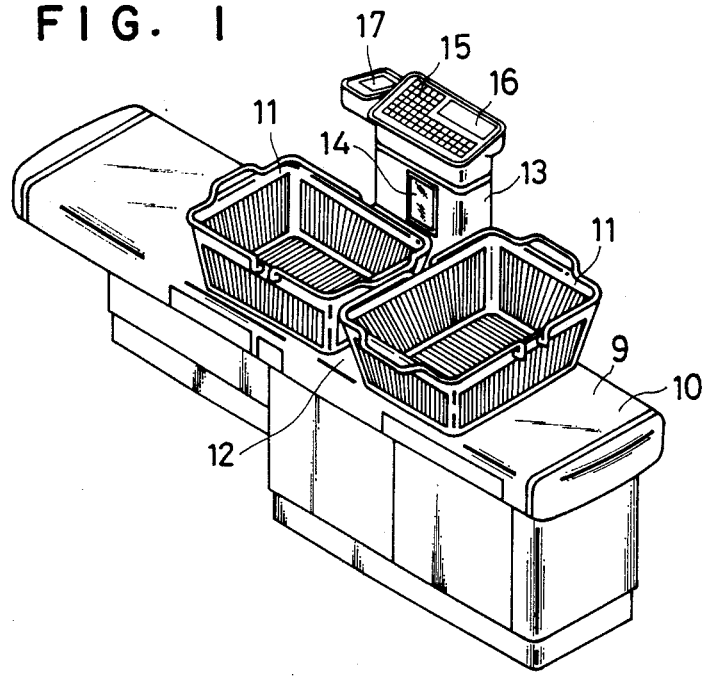
FIG. 1 is a perspective view showing a first embodiment of the present invention.
Figure 2:
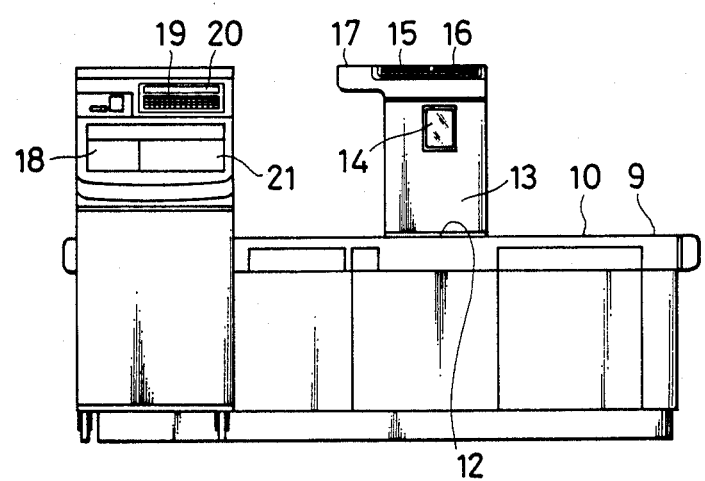
FIG. 2 is a front view of the same.
Figure 3:
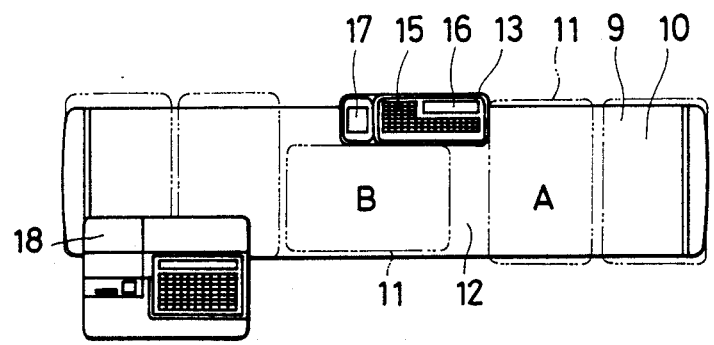
FIG. 3 is a plan view of the same.
Figure 4:
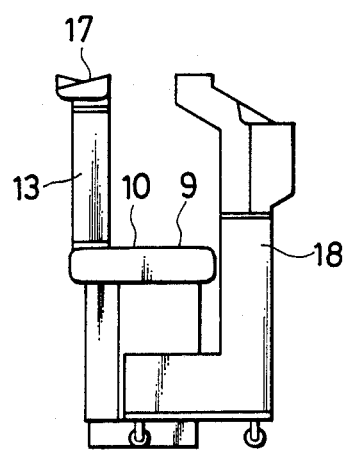
FIG. 4 is a side view of the same.
Figure 7:
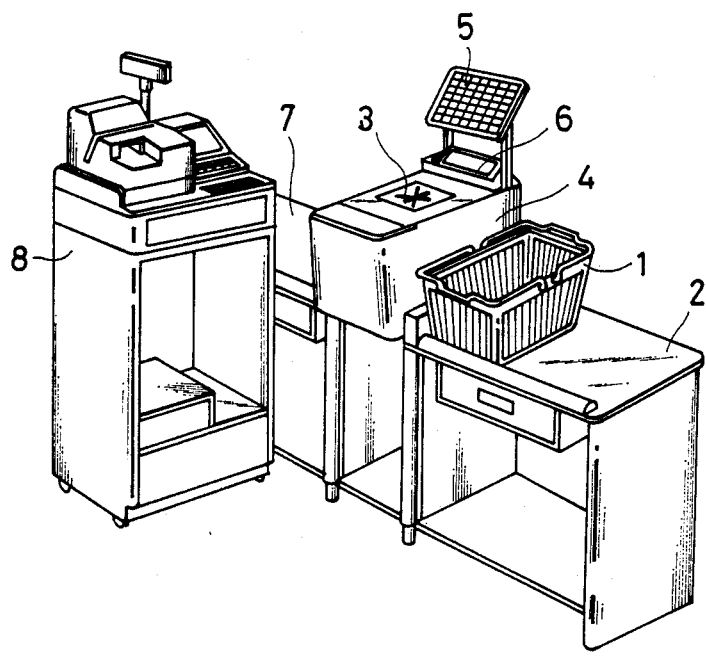
FIG. 7 is a perspective view showing a prior art example.

A first embodiment of the present invention will be described with reference to FIGS. 1 to 4. First, there is installed a commodity counter 10 having thereon a rectangular commodity bearing surface 9 elongated leftward and rightward viewed from the operator. Virtually in the center of the commodity counter 10, there is longitudinally and vertically erected a columnar commodity reader portion 13 with a passing portion 12 for a basket 11 left in front of the same. In the front face of the commodity reader portion 13, there is formed a reading window 14 for the bar code reader, positioned at the height above the height of the basket 11. On the upper side of the commodity reader portion 13, there is disposed a control portion 15 having a keyboard with its surface descending toward the operator, and on the right-hand side of the control portion 15, there is disposed a display portion 16 for the operator. On the left-hand side of the control portion 15, there is juxtaposed therewith a display portion 17 for the customer with its surface descending toward the customer side. The height of the control portion 15 and the display portion 17 is adapted to be virtually in the middle of the height of the eyes of the customer and the height of the commodity counter 10.

The width of the portions of the commodity counter 10 located to the left and to the right of the commodity reader portion 13 is adapted to be larger than the longer side of the basket 11 and the length of the aforesaid portions in the direction of the commodity flow is adapted to be such that two baskets 11 may be mounted thereon with their longer sides put in the longitudinal direction. Further, the width of the aforesaid passing portion 12 is adapted to be longer than the shorter side of the basket 11.

To the left of the commodity counter 10, there is disposed a register 18. This register 18 has a keyboard 19, display 20, and a drawer 21.

When reading the commodity with such arrangement, the basket 11 containing the commodities before being read is placed longitudinally as indicated by A, while the basket 11 for receiving the commodities after being read is placed in front of the commodity reader portion 13 laterally as indicated by B, whereby the two baskets 11 are positioned adjacent to each other. Therefore, when carrying out the reading of the commodity by picking out one commodity from one basket 11, passing it alongside the reading window 14, and putting it into another basket 11, an advantage is obtained that the amount of movement of the commodity is small, and hence, only small labor is required therefor.

When the reading of the commodities purchased by a customer is finished, the basket 11 on the right-hand side becomes empty and it must be moved leftward, but it is a very easy operation because what is then required is only to slide the basket 11 along the surface of the commodity counter 10.

Meanwhile, the customers moves behind the commodity counter 10 from right to left. Then, during the reading operation made by the operator, the readout is given on the display portion 17 located on the side nearer to the register 18, and therefore, the attended customer spontaneously moves to the left to look at the display portion 17, whereby the customer is naturally brought in a position ready to pay for the purchases in cash at the register 18, when, the next customer can stand by at the right side of the commodity counter 10. Thus, a smooth flow of customers can be attained.

Also, since the height of the control portion 15 and display portion 17 is virtually in the middle of the height of the eyes of the customer and the height of the commodity counter 10, the customer can simultaneously observe the movement of commodities and the display portion 17 during the reading operation, and thereby, reliability on the checking out of the commodities is enhanced.

Now, a second embodiment of the present invention will be described with reference to FIGS. 5 and 6. Like parts to those in the first embodiment are denoted by the corresponding reference numerals and explanation thereof is omitted herein. First, in the present invention, an L-shaped mobile housing 23 having a leg portion 22 attached to the under side thereof is provided. At the upper portion of the housing 23, there is provided a commodity reader portion 13 with a reading window 14 opened frontward, or toward the operator. Above the commodity reader portion 13, there is provided a control portion 15 with a display portion 16 provided above the same.

Since the thus constructed housing 23 is adapted to be movable by means of the leg portion 22, the same can be fixedly positioned at the rear side of the center of an existing table 24 as shown in FIG. 6. Thus, it becomes possible to use the table 24 as a commodity counter 10. Hence, a commodity reader apparatus can be set up at any desired position by shifting the position of the housing 23, and also, when it is not in use, it can be stored in another place not occupying much space.

The present invention, as described so far, comprises a commodity counter having a commodity bearing surface being flat and elongated leftward and rightward, a commodity reader portion provided on the commodity counter located virtually in its center and leaving a passing portion for a basket in front thereof, a reading window provided in the front face of the commodity reader portion and at the height above the height of the basket, and a control portion and a display portion provided above the commodity reader portion. Since the distance between the basket containing commodities before being read and the basket for receiving the commodities after being read can thereby be shortened, and also, the reading window is facing frontward, the amount of movement of the commodity can be made smaller, and further, since the emptied basket can be moved only by sliding it on the flat-topped commodity counter, the labor required for the aforesaid operations can be largely reduced. Furthermore, since a display portion for the customer is located at a position shifted in the direction of the flow of the customers from the control portion provided above the commodity reader portion, the attended customer spontaneously moves toward the exit side, and thereby, the flow of the customers can be made smooth. Besides, since the commodity reader portion can be incorporated in a movable housing, an existing stand such as a table can be utilized as the commodity counter, and also, the commodity reader portion can be set up in any desired position.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. An apparatus for checking out purchases comprising a commodity counter with a commodity receiving surface being flat and elongated leftward and righward, a basket, a columnar commodity reader portion provided on the commodity counter located in a center portion thereof and leaving a passing portion for said basket to be positioned in front of said commodity reader portion, a reading window provided in the front face of the columnar commodity reader portion and at a position above the basket, and a control portion and a display portion provided on the columnar commodity reader portion.

2. An apparatus for checking out purchases according to claim 1, wherein said display portion comprises a display portion for use by customers, said display portion being located at a position shifted in the direction of the flow of customers from the control portion provided above the commodity reader portion.

3. An apparatus for checking out purchases according to claim 1, wherein said basket has a rectangular bottom face, and wherein the width of said commodity counter is adapted to be larger than the longer side of said basket and the width of the passing portion for the basket in front of said commodity reader portion is adapted to be larger than the shorter side of said basket.

4. An apparatus for checking out purchases according to claim 1, wherein said commodity reader portion including said reading window, control portion, and display portion is incorporated in a mobile housing which is provided with a leg portion.

* * * * *